No. 12,419. REISSUED DEC. 12, 1905.
E. CANTONO.
ELECTROMECHANICAL DEVICE FOR ELECTRIC TRACTION.
APPLICATION FILED MAY 10, 1905.
Fig. 1,
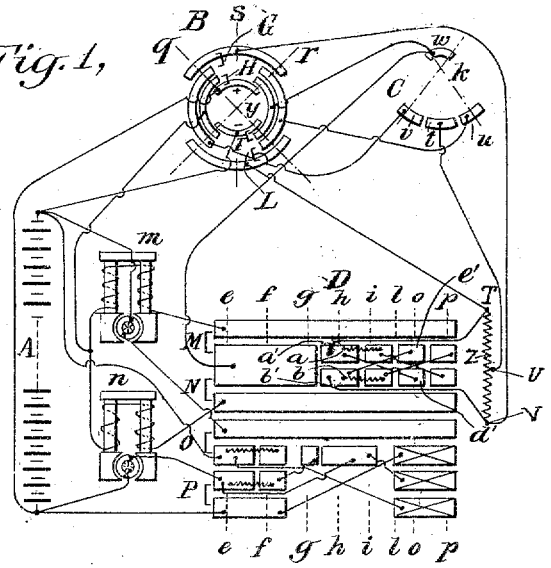
Fig. 2,
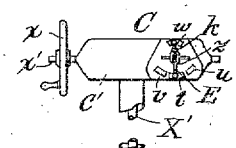
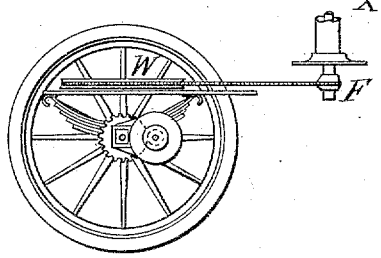
Fig. 3,
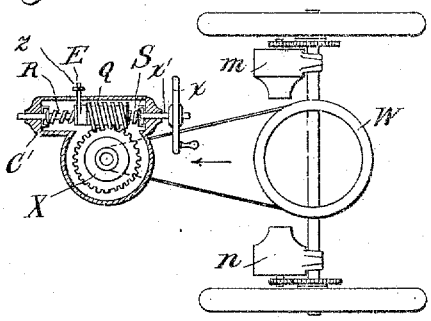
WITNESSES:
Grace D. Heasley
Harry Schnage.
INVENTOR
Eugenio Cantono
BY
Charles D. Jones
His ATTORNEY

UNITED STATES PATENT OFFICE.

EUGENIO CANTONO, OF ROME, ITALY, ASSIGNOR, BY DIRECT AND MESNE ASSIGNMENTS, OF THIRTY-SIX FORTIETHS TO GIOVANNI MAZZACORATI, TWO-FORTIETHS TO EDWARD DE RESZKE, AND TWO-FORTIETHS TO PAUL M. HERZOG, OF NEW YORK, N. Y.

ELECTROMECHANICAL DEVICE FOR ELECTRIC TRACTION.

No. 12,419. Specification of Reissued Letters Patent. Reissued Dec. 12, 1905.

Original No. 692,236, dated February 4, 1902. Application for reissue filed May 10, 1905. Serial No. 259,853.

*To all whom it may concern:*

Be it known that I, EUGENIO CANTONO, captain of engineers in the Italian army, a subject of the King of Italy, residing at Rome, in the Kingdom of Italy, have invented certain Improvements in Electromechanical Devices for Electric Traction, (for which I have obtained Letters Patent in the Kingdom of Italy, dated April 13, 1899, Reg. Att. Vol. 109, No. 55,) of which the following is a clear and complete specification.

The present invention relates to improvements in electric-motor cars, and particularly the driving and steering devices thereof; and the invention embodies electromechanical switch devices which reduce the effort of steering on the part of the operator to a minimum in light motor-cars and in heavy ones greatly facilitates it.

One object of the invention is to provide means by which a vehicle may be steered by varying the excitation of the fields of two motors relatively to each other, said motors being geared independently to the driving-wheels.

A further object of the invention is to combine the mechanical steering mechanism with the electric steering mechanism in such manner that the latter shall be under the control of the former, so as to render the steering effort of the motors in perfect accord with the mechanical action exercised by the driver on the steering-wheel.

The invention consists in the novel construction, arrangement, and combination of parts, as hereinafter fully described, illustrated in the drawings, and pointed out in the appended claims.

In the drawings, Figure 1 is a general diagrammatic view illustrating my invention. Fig. 2 is a side view, partly broken away, of part of a vehicle, showing part of my invention combined therewith. Fig. 3 is a sectional plan view of the parts seen in Fig. 2.

Referring to the drawings, the reference-letters $m$ and $n$ designate two motors independently geared to the driving-wheels.

C′ designates a suitable box or casing, and mounted in bearings therein is a shaft $x'$, adapted to be rotated by a hand-wheel $x$. Slidably keyed to the shaft $x'$ is a worm Q, which meshes with a wheel X, fixed to a vertical shaft X′, having bearings in the casing C′. To the shaft X′ is fixed a wheel F, by which the mechanical steering power is transmitted by a chain to a steering-wheel W, fixed on the front axle. Springs R and S, surrounding the shaft $x'$, are interposed between the ends of the worm and opposite walls of the casing C′. In operating this mechanical steering mechanism the wheel $x$ is turned in a left-handed direction if it is desired to turn the vehicle to the left. As the worm Q is slidably keyed on its shaft, the resistance offered through the wheel X results first in a longitudinal movement of said worm along its shaft to the right and the compression of spring S until the counter-action of the latter is sufficient to overcome the resistance offered to the turning of the wheel X. If, on the other hand, the vehicle is to be turned to the right, the wheel $x$ will be turned in a right-handed direction and the worm Q moved longitudinally on its shaft to the left, so as to compress the spring R. The vehicle will therefore be caused to turn in the direction in which the hand-wheel $x$ is turned as soon as either of the springs R and S, according to the direction in which the worm Q moves, reaches its limit of compression, so as to overcome the resistance offered through the wheel X. It will thus be seen that a short interval of time elapses between the beginning of the turning of the wheel $x$ and the beginning of the turning movement of the wheel X by the wheel $x$.

The mechanical steering mechanism above described is utilized by me to control and to automatically effect the desired variation of the intensities of the fields of the motors $m$ and $n$. This variation may be utilized alone to effect the steering of the vehicle or in combination with the mechanical means above described, in which case the manual effort to steer exerted by the operator is reduced to a minimum in light vehicles and greatly facilitated in heavy vehicles. This control of the electrical steering is accomplished in the short interval of time between the turning of the hand-wheel $x$ and the turning of the wheel X, as follows: In the diagram of the circuits, Fig. 1, A designates the battery; B, the reversing-switch; C, the automatic switch for steering; D, the controller to regulate the different speeds, and *m* and *n* the electric motors. The switch C is controlled by an arm E, attached to the worm Q, which when the latter is moved longitudinally on its shaft, as above described, actuates the lever *z* of said switch, said lever being pivoted at the point *k*. When the vehicle is traveling forward in a straight line, the plates *w* and *t* of the switch C are electrically connected so as to insert a resistance Z half into the field of the motor *m* and half into the field of the motor *n*. When it is desired to steer in one direction or the other, then the resistance of one of the motors must be thrown out of the field of that motor and into the field of the other motor, so that the total resistance Z must be wholly in the field of one of the motors. It is also necessary that the steering effort exerted by the motors shall correspond in direction with the mechanical effort exerted by the driver on the mechanical steering mechanism. This correspondence is obtained, as will be hereinafter described, by the use of special connections on the controller D, by which the different speeds are effected, and with a reversing-switch B, which is used for the backward speeds.

The bridges M N O P of the controller D, which are connected mechanically with each other, but insulated electrically, can take the following positions: In the position *e e* the motors are excited and the brushes short-circuited, so that there is a strong electric braking action. In the position *f f* the motors are still excited and the brushes short-circuited with the resistance *c* for the motor *m* and the resistance *d* for the motor *n*. The braking action is therefore weak. *g g* represent the starting position of the car, the two motor-armatures being in series with the battery A and their excitation complete. In the position *h h* the armatures are in series and the exciting-current passes through the resistance Z, intended for steering, the method of operation of which will be hereinafter described. In the position *i i* the motor-armatures are also connected in series. The exciting-current passes in this case also through the resistance Z, and additional resistances *a b* are inserted in the field-circuits of the motors. *l l* represent the position of the motors when they pass from the series connections to the parallel. *o o* represent the position in which the motors are in parallel. In the position *p p* the motors are likewise in parallel and the resistances *a b* are inserted in the field-circuits.

The four bridges G H I L of the reversing-switch B, insulated electrically and connected with each other by means of a lever pivoted at *y*, have three positions, as follows: *s*, the position of interruption of excitation of the fields of the motors; *q*, the position in which the excitation operates the forward travel, and *r* the position in which the current of the field of the motors—that is, the polarity thereof—is reversed when the vehicle travels backward.

The switch C is intended to operate the electric control of the vehicle by means of the resistance Z. It acts in connection with the controller D and works for the forward travel as well as for the backward travel of the vehicle and operates in the positions *h h*, *i i*, *l l*, *o o*, *p p* of the bridges M N O P of the controller D. Assuming that the bridges M N O P of the controller D stand in the position *h h* and the bridges G H I L of the switch B in the position *q q* for the forward travel of the vehicle, a lever pivoted at *k* in the switch C and operated automatically is arranged so that it can connect the plate *w* with the plate *t*, *u*, or *v*. If now the plate *w* is connected with the plate *t*, the negative pole of the battery becomes connected, by means of the bridge I, with the plate *w*, and the current consequently passes to the plate *t* and to the center of the resistance Z at the point U. The resistance is therefore inserted half in the field of the motor *m* and half in that of the motor *n*. Forward motion in a straight line is thus obtained.

Case 1. If now when the vehicle is traveling forward it is desired to steer to the left, the driver turns the hand-wheel *x* in a left-handed direction, causing the worm Q to move longitudinally to the right, thus moving the lever *z* of the switch C to electrically connect the plate *w* with the plate *u*. At such times the armatures of the motors may be either in series or in parallel, according to the position of the brushes on the controller-drum, the effect of the excitation upon the fields of the motors being contrary in the two instances, but with the same result as to change in speed—that is, when the vehicle is traveling forward with the motor-armatures in series and it is desired to turn to the left an increase in the excitation of the field of the right-hand motor is necessary in order to increase its speed. When, however, the motor-armatures are in parallel, with the same conditions of direction of travel and steering, a decrease in the excitation of the field of the right-hand motor is necessary in order to increase its speed. The same is true when turning to the right with the vehicle traveling forward, except that the increase or decrease of the excitation must be in the field of the left-hand motor, according as to whether the motor-armatures are in series or in parallel. In other words, when steering to the left or right when traveling forward with the motors in series the increase of excitation must be in the field of that motor on the side opposite to that of the direction of turning in order to increase its speed, and when in parallel the decrease of excitation must be in the field of that motor also on the side opposite to that of the direction of turning to thereby increase its speed. Assuming now that the brushes are in the position *h h* or *i i*, thus placing the armatures *m* and *n* in series, the plate *w* being connected with the battery A, the current flows from *w* to plate *u*, to the switch B, and by means of the bridge L to the point T of the resistance Z, where it finds two paths open, one to contact-plate *a'*, through bridge M, to the field of the right-hand motor *m*, to battery; the other path from point T, through all of the resistance Z, to contact-plate *b'*, bridge N, to the field of the left-hand motor *n*, to battery. Thus the whole resistance Z is inserted in the field of the left-hand motor *n*, while the current passes direct into the right-hand motor *m*. This results in an increase of the excitation of the field of the right-hand motor *m*, thereby increasing its torque and said motor will pull more. A corresponding decrease of the excitation of the field of the motor *n* occurs, thereby proportionately decreasing its torque, and the motor *n* will therefore pull less. The result of this variation in the excitation of the fields of the two motors is that the vehicle will turn to the left—that is, in the direction of the effort made by the driver upon the mechanical steering mechanism. If, on the other hand, the controller-brushes occupy the position *o o* or *p p*, the armatures of the motors *m* and *n* will be in parallel. The current can now be traced from point T, one path being through the contact-plate *a'*, a diagonal connection to plate *d'*, bridge N, to the field of motor *n*, to battery; the other path from T through all of the resistance Z to contact-plate *b'*, a diagonal connection to plate *e'*, bridge M, to the field of motor *m*, to battery. Thus the whole resistance is inserted in the field of the motor *m*, while the current passes directly to the field of the motor *n*. This decrease of the excitation of the field of the right-hand motor *m* results in an increase of the speed of said motor precisely as effected by the increase of the excitation of said field when the motor-armatures are in series. A proportional increase in the excitation of the field of the left-hand motor *n* occurs, with a resulting proportional decrease in the speed of that motor. The vehicle will therefore turn to the left in harmony with the manual effort exerted by the driver on the hand-wheel *x*.

Case 2. If we assume now that the vehicle is traveling forward and it is desired to turn to the right, the driver turns the hand-wheel *x* in a right-handed direction, and the worm Q moving longitudinally to the left will move the lever *z* so as to connect the plates *w* and *v*. With the controller-brushes in either of the positions *h h*, *i i* the armatures of the motors *m* and *n* will be in series. By tracing the circuits it will be seen that all of the resistance Z is inserted into the field of the right-hand motor *m*, resulting in a decrease of the excitation of the field of said motor, and consequently a decrease of its torque. A corresponding increase occurs in the excitation of the field of the left-hand motor *n*, and consequently an increase of its torque. The vehicle will therefore turn to the right. If the controller-brushes are in either of the positions *o o* or *p p*, then the armatures of the motors *m* and *n* will be connected in parallel. By tracing the circuits it will be seen that all of the resistance Z is now thrown into the left-hand motor *n*, thereby decreasing the excitation of its field and increasing the speed of said motor. At the same time there occurs a proportionate increase in the excitation of the field of the right-hand motor *m* and a decrease of its speed. The vehicle will therefore turn to the right.

Case 3. When steering in the backward travel of the vehicle, the conditions are exactly the reverse of those when steering in the forward travel—that is, the motor which has its speed increased on the forward travel has its speed decreased when steering on the backward travel, and vice versa. This is effected by the reversal of the current through the switch B. Assuming that the armatures of the motors are in series and the lever pivoted at *y* of switch B moved so as to lie in the position *r r*, in such case when it is desired to turn to the left the driver turns the hand-wheel *x* to the left, thus connecting the plates *w* and *u* in the switch C in the same manner as before described when traveling forward. Tracing the circuits, it will be seen that the current flows from battery A to plate *w*, to plate *u*, to the connection *s* of switch B, to V, where it finds two paths open, one directly through the field of the left-hand motor *n* to battery and the other through the resistance Z, through the field of the right-hand motor *m*, to battery. This results in an increase of excitation of the field of the motor *n* and an increase of the torque of said motor, so that it will pull more. At the same time a proportional decrease of the excitation of the field of the motor *m*, with a decrease of its torque, will occur, and the motor *m* will therefore pull less and the vehicle will turn to the left. With the armatures of the motors *m* and *n* in parallel and steering to the left in backward travel the conditions immediately above described are reversed, as will be seen by tracing the circuits—that is, the whole resistance Z is inserted into the field of the left-hand motor *n*, resulting in a decrease of the excitation of the field of said motor and an increase in the speed of said motor. At the same time there occurs a proportional increase in the excitation of the field of the motor *m*, with a decrease in the speed of said motor. The vehicle will therefore turn to the left.

Case 4. With the controller-brushes in the positions *h h* or *i i*, so that the armatures of the motors *m* and *n* are in series and it is desired to steer to the right with the vehicle traveling backward, the hand-wheel $x$ is turned to the right, thus moving the worm Q longitudinally to the left, so as to connect the plates $w$ and $v$. By tracing the circuits it will be seen that the whole resistance Z is inserted into the field of the left-hand motor $n$, resulting in a decrease of the excitation of the field of said motor and a decrease in the speed of said motor. At the same time the excitation of the field of the right-hand motor $m$ and the speed of said motor are proportionately increased, so that the vehicle will turn to the right. With the controller-brushes in the positions $o$ $o$ or $p$ $p$, so that the motor-armatures are in parallel and it is desired to steer to the right on the backward travel, the hand-wheel $x$ is turned to the right. Tracing the circuits, it will be seen that the whole resistance Z is inserted into the field of the right-hand motor $m$, thereby decreasing the excitation of the field and increasing the speed of said motor. At the same time the excitation of the field of the left-hand motor $n$ is proportionately increased with a decrease in the speed of the motor $n$. The vehicle will therefore turn to the right.

In all of the above-described operations it will be noted that the lever $z$ of the switch C is moved by the longitudinal movement of the worm Q, and thus the variation of the intensities of the fields of the motors $m$ and $n$ effected before the mechanical steering through the rotation of the wheel X is effected. In light vehicles, therefore, the electrical steering mechanism may be sufficient for the purpose, requiring only the longitudinal movement of the worm Q by the driver, while with heavy vehicles it is obvious that the manual effort of the driver to operate the mechanical steering mechanism is greatly facilitated. In both cases the driver continues to turn the hand-wheel $x$ in the direction in which he started until the front axle of the vehicle is brought to the required angle for turning. When that is reached, the parts are restored to their normal positions for traveling straight forward. It is also to be noted that in all of the steering operations the vehicle is caused to turn in the direction in which the hand-wheel $x$ is turned—that is, the effort of the electrical steering mechanism corresponds in direction with the manual effort exerted by the driver on the mechanical steering mechanism.

It will be understood, of course, that the axle with which the steering is effected is pivoted in the usual manner, so as to be permitted to turn relatively to the vehicle-body.

What I claim, and desire to secure by Letters Patent, is—

1. In a steering mechanism for vehicles the combination of a plurality of motors independently geared to the driving-wheels, means for connecting the armatures of said motors in series, and means for steering the vehicle when traveling forward, with the motors so connected, by increasing the excitation of the field and thereby increasing the speed of that motor on the side opposite to that of the direction of turning.

2. In a steering mechanism for vehicles the combination of a plurality of motors independently geared to the driving-wheels, means for connecting the armatures of said motors in series, and means for steering the vehicle to the left or right when traveling backward, with the motors so connected, by increasing the excitation of the field and thereby increasing the speed of that motor on the same side as that of the direction of turning.

3. In a steering mechanism for vehicles the combination of a plurality of motors independently geared to the driving-wheels, means for connecting the armatures of said motors in parallel, and means for steering the vehicle when traveling forward, with the motors so connected, by decreasing the excitation of the field and thereby increasing the speed of that motor on the side opposite to that of the direction of turning.

4. In a steering mechanism for vehicles the combination of a plurality of motors independently geared to the driving-wheels, means for connecting the armatures of said motors in parallel, and means for steering the vehicle to the left or right when traveling backward, with the motors so connected, by decreasing the excitation of the field and thereby increasing the speed of that motor on the same side as that of the direction of turning.

5. In a steering mechanism for vehicles the combination of a plurality of motors independently geared to the driving-wheels, means for connecting the armatures of said motors either in series or in parallel, and means for steering the vehicle to the left or right when traveling forward by increasing the excitation of the field and thereby increasing the speed of that motor on the side opposite to that of the direction of turning when the motors are in series, and decreasing the excitation of the field of the same motor and thereby increasing its speed when the motors are connected in parallel.

6. In a steering mechanism for vehicles the combination of a plurality of motors independently geared to the driving-wheels, means for connecting the armatures of said motors either in series or in parallel, and means for steering the vehicle to the left or right when traveling backward, by decreasing the excitation of the field and thereby decreasing the speed of that motor on the side opposite to that of the direction of turning when the motors are in series, and increasing the excitation of the field and thereby decreasing the speed of the same motor when the motors are connected in parallel.

7. In an electrically-propelled vehicle the combination with a driving-axle, of a plurality of motors independently geared to the driving-wheels, a switch included in the circuits of the fields of said motors, a resistance controlled by said switch so as to be inserted wholly into the circuit of either motor, a mechanical steering mechanism and means connecting said mechanism and switch whereby the latter is controlled by the movement of said mechanism.

8. A steering mechanism for vehicles comprising electric motors connected independently to the driving-wheels, a switch, means controlled by said switch for varying the excitation of the fields of said motors, mechanical steering mechanism connected with the axle, and means controlled by said mechanical steering mechanism to actuate said switch, the parts being so related that the switch will be actuated before the steering by the mechanical mechanism is effected.

9. In a steering mechanism for vehicles the combination of electric motors connected independently to the driving-wheels, a switch, a resistance controlled by said switch so as to be inserted wholly into the circuit of the field of either motor, mechanical steering mechanism connected with the axle, and means controlled by said mechanical steering mechanism to actuate said switch, the parts being so related that the switch will be actuated before the steering by the mechanical mechanism is effected.

10. The combination with the motors, of a steering-switch comprising contact-blocks and a lever adapted to be brought into contact with said blocks, a resistance adapted to be brought into the magnetic field of the motors or either of them to vary their speed according as the lever is brought in contact with the different blocks as described, means for mechanically actuating the lever comprising a hand-wheel, a worm actuated thereby, a spirally-toothed wheel meshing with the worm, a driving-wheel on the shaft of the spirally-toothed wheel, a steering-wheel mounted on the axle of the vehicle, a chain gearing the steering-wheel and driving-wheel together, a pin on the worm adapted to actuate the lever of the steering-switch, and connections between the steering mechanism and the motors and adapted to be actuated by the latter as set forth.

11. In a steering mechanism for vehicles the combination of a plurality of motors independently geared to the driving-wheels of the vehicle, means for connecting the armatures of said motors in series, and means for steering the vehicle to the left or right when traveling forward by increasing the excitation of the field and thereby increasing the speed of that motor on the side opposite to that of the direction of turning, and reversing said conditions when traveling backward.

12. In a steering mechanism for vehicles the combination of a plurality of motors independently geared to the driving-wheels of the vehicle, means for connecting the armatures of said motors in parallel, and means for steering the vehicle to the left or right when traveling forward by decreasing the excitation of the field and thereby increasing the speed of the motor on the side opposite to that of the direction of turning, and reversing said conditions when traveling backward.

In testimony whereof I have hereunto signed my name in the presence of two subscribing witnesses.

EUGENIO CANTONO.

Witnesses:
A. Rozzi,
Pio Prialdino.